US 7,797,374 B2

(12) United States Patent
Prince (10) Patent No.: US 7,797,374 B2
(45) Date of Patent: Sep. 14, 2010

(54) SYSTEM AND METHOD FOR PROVIDING DIGITAL MESSAGING SERVICES

(75) Inventor: George Prince, Marblehead, MA (US)

(73) Assignee: CBS Interactive Inc., County of New Castle, DE (US)

( * ) Notice: Subject to any disclaimer, the term of this patent is extended or adjusted under 35 U.S.C. 154(b) by 2835 days.

(21) Appl. No.: 09/836,890

(22) Filed: Apr. 17, 2001

(65) Prior Publication Data

US 2002/0165923 A1 Nov. 7, 2002

(51) Int. Cl.
G06F 15/16 (2006.01)
(52) U.S. Cl. ........................ 709/203; 709/206
(58) Field of Classification Search ................. 709/202, 709/203, 205, 208, 213, 218, 227, 228, 206; 705/14

See application file for complete search history.

(56) References Cited

U.S. PATENT DOCUMENTS

| | | | | |
|---|---|---|---|---|
| 5,909,492 | A | 6/1999 | Payne et al. | 705/78 |
| 5,950,173 | A | 9/1999 | Perkowski | 705/26 |
| 6,038,545 | A | 3/2000 | Mandeberg et al. | 705/15 |
| 6,064,979 | A * | 5/2000 | Perkowski | 705/26 |
| 6,154,738 | A | 11/2000 | Call | 707/4 |
| 6,191,780 | B1 | 2/2001 | Martin et al. | 715/500.1 |
| 6,195,651 | B1 * | 2/2001 | Handel et al. | 707/2 |
| 6,418,441 | B1 * | 7/2002 | Call | 707/10 |
| 6,513,019 | B2 * | 1/2003 | Lewis | 705/35 |
| 6,571,279 | B1 * | 5/2003 | Herz et al. | 709/217 |
| 6,594,682 | B2 * | 7/2003 | Peterson et al. | 718/102 |
| 6,631,496 | B1 * | 10/2003 | Li et al. | 715/501.1 |
| 6,760,694 | B2 * | 7/2004 | Al-Kazily et al. | 704/2 |
| 2001/0054066 | A1 * | 12/2001 | Spitzer | 709/203 |
| 2002/0033837 | A1 * | 3/2002 | Munro | 345/654 |
| 2002/0165912 | A1 * | 11/2002 | Wenocur et al. | 709/203 |
| 2003/0041110 | A1 * | 2/2003 | Wenocur et al. | 709/206 |

* cited by examiner

*Primary Examiner*—Ario Etienne
*Assistant Examiner*—Sargon N Nano
(74) *Attorney, Agent, or Firm*—Marc S. Kaufman; Nixon Peabody, LLP (57) ABSTRACT

An exemplary embodiment of the invention relates to a system and method for providing digital messaging services received from multiple sources over a communications network. The system includes a client system, including a display screen coupled to a communications link; a workstation including a web browser, a memory, and a processor, said workstation coupled to said communications link; a hosting system, including a graphics server, a content server, and a scheduling server, each in communication with each other via a communications link; and a workstation and data storage device coupled to the communications link; and a data storage device for storing data utilized by said hosting system.

The client system requests and receives digital messaging services from said hosting system under a subscription agreement. Digital messaging services include advertisements procured from said client system, and one or more local content providers, national advertisers, local advertisers, corporate marketing groups, and advertising agencies. Interactive digital messaging services are also available through the present invention. A user accesses these services via a variety of input devices; such as a bar code scanner, a wireless telephone or personal digital assistant, a kiosk with touch screen design, microphone, or other similar input device.

1 Claim, 7 Drawing Sheets

TO LEARN MORE ABOUT OUR ADVERTISING OPPORTUNITIES...

VIEW ADVERTISING OPPORTUNITIES DEMO

LOGIN TO VIEW &
PURCHASE INVENTORY

REGISTERED ADVERTISING CLIENT

LOGIN TO APPROVE
ADVERTISING & PERSONALIZE

REGISTERED RETAIL CLIENT

NEW CLIENTS, PLEASE REGISTER AS AN ○ADVERTISER ○RETAILER (SELECT ONLY 1)

YOUR NAME     YOUR COMPANY NAME     YOUR TELEPHONE NUMBER     YOUR E-MAIL ADDRESS

SUBMIT

SYSTEM AND METHOD FOR PROVIDING DIGITAL MESSAGING SERVICES

BACKGROUND

The present invention relates generally to computer-implemented digital messaging. More particularly, the present invention relates to a method and system for communicating consumer-oriented information to customers in a retail environment via a computerized network system.

For marketing groups and corporate retailers, the media advertising planning process is not an easy one. Numerous marketing channels are available to choose from and include mass media such as television, newspapers, radio, and magazines, as well as out-of-the-home media such as outdoor and transit advertising, and electronic billboards. Additionally, support media such as direct marketing, interactive media, promotional products advertising, and in-store point-of-purchase options are also available options for consideration. Selecting from these choices of media is cumbersome, in part due to the nature of the media themselves. Each media channel has its own advantages and disadvantages. TV features both sight and sound, unlike most other media. Although TV offers greater coverage capabilities, those capabilities may be offset by its expense and intrusive 'push'-type nature. Viewers, in other words, are captive audiences of advertisements and must take active measures to avoid them, e.g., changing channels. It is also a nonselective medium, as it is difficult to reach a precisely defined market segment. This is likely due to changing variations in the composition of audiences due to variables such as program content, broadcast time, and geographic coverage. Buying air time on a TV program does not guarantee a product's exposure but merely provides an opportunity to communicate a message to large numbers of consumers. But there is increasing evidence that the size of the viewing audience shrinks during a commercial break. Thus, getting consumers to pay attention to commercials has become a greater challenge. The increased presence of VCRs and remote controls has led to the problems of zipping (i.e., fast forwarding through commercials during the playing of a previously recorded program), or zapping (i.e., the changing channels to avoid commercials). Measuring the effectiveness of a television advertisement on the sale of a product can also be problematic for the product's marketing group.

Advertising by radio offers a low cost alternative to television. It requires only a script to be read by the radio announcer or a pre-recorded message to be aired. Air time is also inexpensive to purchase. Radio, however, has creative limitations owing to the absence of a visual image. The brief, fleeting nature of the radio commercial, as well as the fragmented composition of the radio audience, are also problematic. Much like it's television counterpart, measuring the effectiveness of a radio advertisement can also be difficult. Audience rating services such as Arbitron™ for local radio audiences and RADAR™ studies for network audiences are sources of ratings information.

Magazine advertising has the capability to convey more information and keep that information available to a consumer for a long time, unlike a newspaper alternative which is typically thrown away after it has been read. One advantage of magazine advertising is its selective audience targeting. For example, it comes as no surprise that a magazine such as Modern Photography™ would be a suitable medium for the likes of Nikon™, Polaroid™, and Canon™ for advertising their cameras and equipment. Disadvantages of magazine advertising include high cost and limited audience reach and frequency. That is, while many people read one or more consumer magazines each month, studies indicate the percentage of adults reading any individual publication tends to be much smaller, resulting in a thin penetration of households. Newspapers also offer advantages, as do outdoor and direct media. Each of these alternatives must be carefully considered, along with many other factors. This process becomes even more complicated when the advertiser is faced with selecting between alternatives within the same medium, (e.g., Time™ and Newsweek™). The product and/or service being advertised also affects the media planning process. Businesses have found some media more useful than others in conveying their messages to specific target audiences. Marketing budgets and availability of sales measurements also affect these decisions.

Interactive media such as Internet, online services, kiosks, and interactive TV are becoming increasingly utilized and present some significant advantages over the traditional 'passive' channels. Interactive media allows the consumer to literally interact with the source, offering targeted specific market segments, as well as direct dealings with a user. Interactive media are providing new ways of getting messages out to the public. Digital signage companies are beginning to pop up, taking advantage of the lowering costs of technology and widespread use of the Internet by the public in general. Digital signage messaging enables variable, point-of-use information, targeted for a selected audience.

Digital signage companies currently operating in the market today are primarily designed around a business model that targets captive audiences (e.g., visitors waiting in line, in an elevator, in a waiting room, on an exercise bike, etc.). For example, Netpulse™ provides digital messaging services to health clubs via displays such as those found on a treadmill. Information provided may include health and dieting tips, as well as information targeted to the type of individuals likely to be using that treadmill. The value proposition to the viewer is not so much to inform as it is to entertain, i.e. to make the wait more tolerable. In exchange for a more tolerable wait, the viewer 'agrees' to watch advertising. Thus, the business model currently used is a 'push' advertising model—an audience that, even if they are receptive to the advertising, cannot act on the message (since they are preparing to leave the store, are stuck in an elevator, waiting for a doctor, etc.).

It would therefore be desirable to provide a digital messaging service at a point of purchase location, that is designed to pull in a viewing audience and which provides customizable and interactive capabilities.

SUMMARY

An exemplary embodiment relates to a computer network-based system and method for providing digital information and advertising to an active audience at a point of purchase location via a communications network. The system includes a client system comprising a display screen, a web-enabled workstation, storage device, and server all of which are coupled to a communications link. The system also includes a hosting system, including a graphics server, a content server, and a scheduling server; a workstation for accessing applications stored on the servers; and a data storage device for storing data utilized by said hosting system all of which are coupled to a communications link. Additional entities interact with the system as described further herein.

The client system requests and receives digital messaging services over the Internet or other similar network configuration from the hosting system under a subscription agreement. Digital messaging services include access to a data collection resource whereby data is collected from many sources on the web and is then assimilated for use and display by one or more of these sources. Interactive digital messaging services are also available through the present invention. A user accesses these services via a variety of input devices, such as a bar code scanner, a wireless telephone or personal digital assistant, a kiosk with touch screen design, microphone, or other similar input device.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

Figure 1:
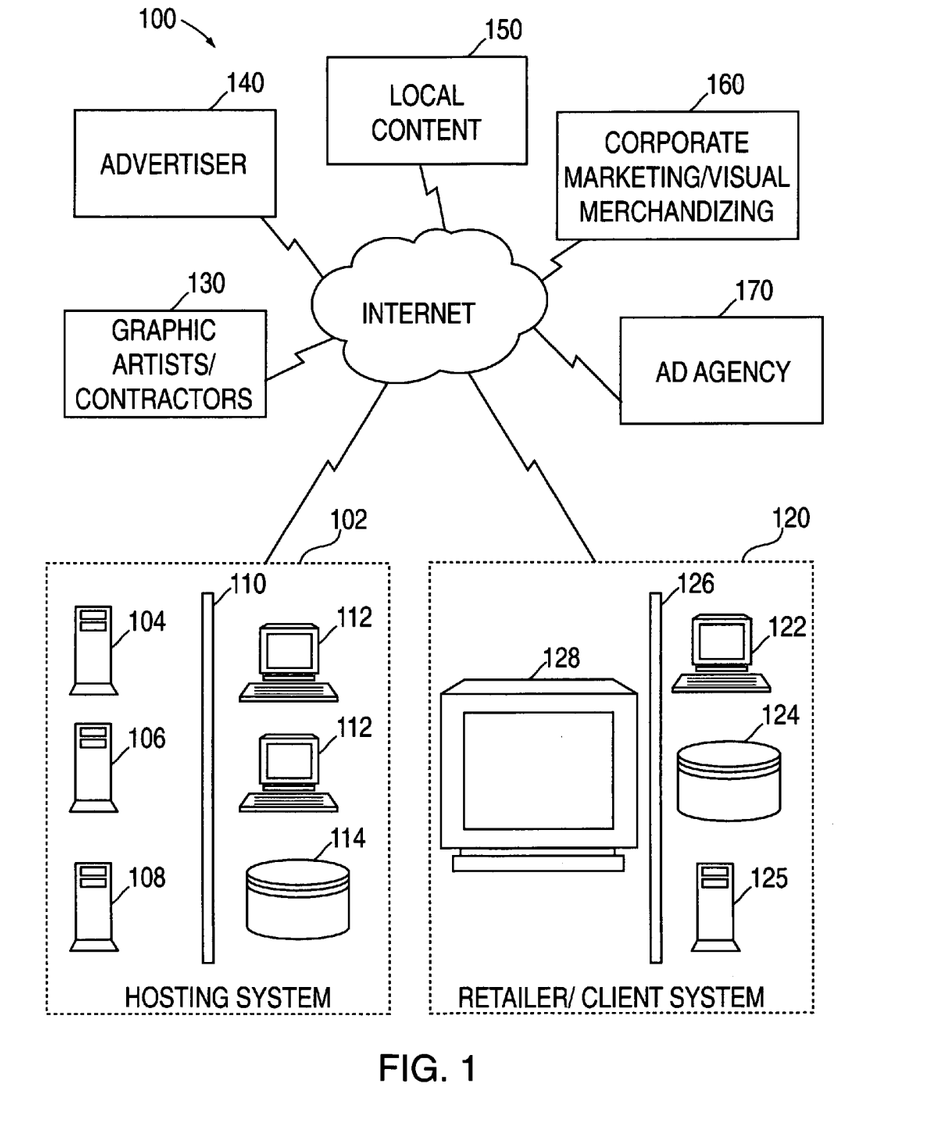
FIG. 1 is a block diagram of a portion of a network system on which the digital messaging system is implemented in an exemplary embodiment of the invention.

A portion of an exemplary network system 100 on which the invention might be used is shown in FIG. 1. System 100 comprises a hosting system 102 for implementing the digital messaging system. Although not necessary to realize the advantages of the present invention, hosting system 102 may be part of a wide area network (WAN), virtual private network (VPN), or a combination of both in which different geographical locations are interconnected, either by high-speed data lines or by radio links, interconnecting multiple workstations at widely disparate locations. In the simplified diagram of FIG. 1, hosting system 102 includes a graphics applications server 104, a content server 106, and a scheduling server 108, all of which are in communication with each other and with entities associated with hosting system 102 via a network connection 110. For purposes of illustration, network 110 is an intranet network infrastructure operating on a local area network (LAN). Network 110 is connected to the Internet via content server 106. Content server 106 includes web server software for hosting and serving web pages of hosting system 102. Content server 106 also includes applications software for initiating customer registration, authorizing access to hosting system's 102 applications, directing visitor requests, forwarding screen-ready content to client system 120, and accessing image and templates databases from data storage device 114 as will be explained further herein.

Graphics applications server 104 provides software for creating, designing, and customizing content via in-house or independent graphics artists, verifying design approvals and disapprovals and forwarding them to designated entities, sending notifications to interested parties concerning the approvals or disapprovals of design templates and content, and saving the finished products to data storage device 114 for subsequent scheduling functions and retrieval by subscribing entities.

Scheduling server 108 periodically pulls finished content or display-ready materials from data storage device 114, checks times, dates, and locations for these materials, and prepares them for display. Server 108 delivers the finished product by the Internet to server 125 for delayed or immediate display on screen 128. Delivery may be accomplished in various ways. For example, client system 120 periodically dials up or contacts hosting system 102 and downloads content via an automated or semi-automated process. Hosting system 102 may also provide notification of content to be delivered to client system 120, followed by transmission of the content for storage and subsequent display at client system 120. Server 108 also tracks and audits this information and generates various reports in accordance with business rules adopted by hosting system 102 and/or client system 120.

Also included in hosting system 102 are workstations 112 utilized by hosting system 102. Workstations 112 communicate with each other, as well as with servers 104, 106, 108, and data storage device 114 via network 110. Workstations 112 may be general-purpose computers, or personal computers (PCs) and include keyboards or other input devices for entering commands and accessing applications and data associated with entities of hosting system 102 such as servers 104, 106, 108, and data storage device 114. In-house graphics artists, system maintenance personnel, and administrative personnel may be typical users of workstations 112. Alternatively, servers 104, 106, and 108 may include monitors, input devices and storage mediums in lieu of workstations 112 and data storage device 114. Data storage device 114 houses databases pertaining to customer registration data, customer billing and reporting, marketing analyses and measurements, and any other information desired by hosting system 102. Hosting system 102 may be connected to the Internet via plain old telephone service (POTS), DSL, T-1, ISDN, or other high-speed communications medium known in the art.

Hosting system 102 provides digital advertising and information services via the Internet to subscribing client system 120 utilizing the digital messaging applications and system devices. Hosting system 102 may provide the necessary hardware, software, network connections, information services, and system maintenance and repair to subscribing customers such as client system 120 for a monthly fee. Customized graphics services may also be provided by hosting system 102 for a fee. Hosting system 102 is the conduit through which national and local advertisers may market products on subscribing systems and through which discounts or rebates are tracked and delivered to those subscribing systems displaying these advertisements.

Also included in system 100 is client system 120 comprising a workstation 122 coupled to a data storage device 124 and display screen 128 via a communications link 126. Client system 120 is typically a retailer who subscribes to hosting system's 102 services. A server 125 may also be included in client system 120 and is coupled to workstation 122 via communications link 126, typically a cable line. Display screen 128 may be a monitor, kiosk, screen or other vehicle that displays images and text. Display screen 128 may be a cathode ray tube (CRT), liquid crystal display (LCD), gas plasma, or other similar type display. Display screen 128 may be connected to workstation 122 in either a wired or wireless fashion. Additionally, any number of display screens 128 may be simultaneously utilized by client system 120, each capable of displaying different content. For example, a retailer of client system 120 may utilize one or more display screens 128 in each aisle of the retail store, or may target specific areas by product or promotion, or ease of viewing capabilities. The term 'content' refers to formats of information display and includes any type of format known in the art including voice, video, and text materials.

Workstation 122 may be a personal computer (PC) including an input device such as a keyboard, mouse, etc. Workstation 122 also includes an internal or external memory such as data storage device 124, and web browser software capable of communicating with hosting system 102. Alternatively, a similar web-enabled device may be utilized in lieu of workstation 122 such as a laptop, PDA, or other suitable appliance. Data storage device 124 stores display-ready content, billing information, reports, market analyses received from hosting system 102, as well as any proprietary information desired by client system 120. Alternatively, such data may be housed in data storage device 114 for subsequent query and retrieval by client system 120. A subscribing retailer at client system 120 logs on the hosting system's 102 web site, accesses the digital messaging application, and designs display screen templates and generates content material to be delivered to display screen 128 via the Internet. Alternatively, a retailer subscribing to these digital messaging services may choose not to advertise its own products but instead allow other advertisers to design and display advertisements for viewing at the retailer's establishment. Conversely, a retailer may choose to display only its own proprietary advertisements and information rather than accept advertisements from third parties. The digital messaging services of this invention allows for each of the above configurations.

Other content available to be displayed on display screen 128 originates from sources outside of client system 120 as shown in system 100 of FIG. 1. Graphics services can be provided via hosting system 102 by establishing an agreement with independent graphic artists 130 who employ Internet and web-enabled devices. Hosting system 102 operates a web site (not shown) through which interested parties such as graphic artists 130 can communicate their desire in providing these services. Graphics artists 130 may register at the web site and this information is made available to subscribing entities 120-170 of system 100. Hosting system 102 may also employ its own graphics artists for these services as well. These services are also listed and provided to requesting entities 120-170. Another source of content to be displayed on display screen 128 originates from national and local advertisers 140. National and local advertisers access hosting system's 102 web site and are allowed to register with hosting system 102 for advertising services to be performed at one or more client systems. Registered advertisers 140 provide detailed information concerning the advertisement as well as any display requirements (e.g., times, dates, locations for display) at the web site. A subscribing retailer such as client system 120 periodically dials up or contacts the web site in order to view, select, retrieve, and display those advertisements which comport with the advertiser's 140 requirements and the retailer's 120 requirements. Alternatively, such contact may be automated if desired.

Yet another source of content includes local content from providers 150 which comprises news, weather, sports, stock market information and the like for viewing on display screen 128. Local content providers 150 are typically under agreement with hosting system 102 to provide these services, and client system 120 may choose one or more of these content providers 150. Once selected, the local content data may be directly disseminated from content provider 150 to client system 120 for display on screen 128. Client system 120 periodically contacts content provider 150 for any updates or changes.

Large client systems 160 with large or dispersed corporate offices can collaborate on the design and nature of content to be displayed utilizing the digital messaging services. For example, a corporate marketing department or visual merchandizing department for a large retail chain can access hosting system's 102 web site and provide content for one or more retail stores such as client system 120. Finally, an advertising agency 170 may access hosting system's 102 web site on behalf of its client in order to assist its customers with their advertising needs.

Figure 2:
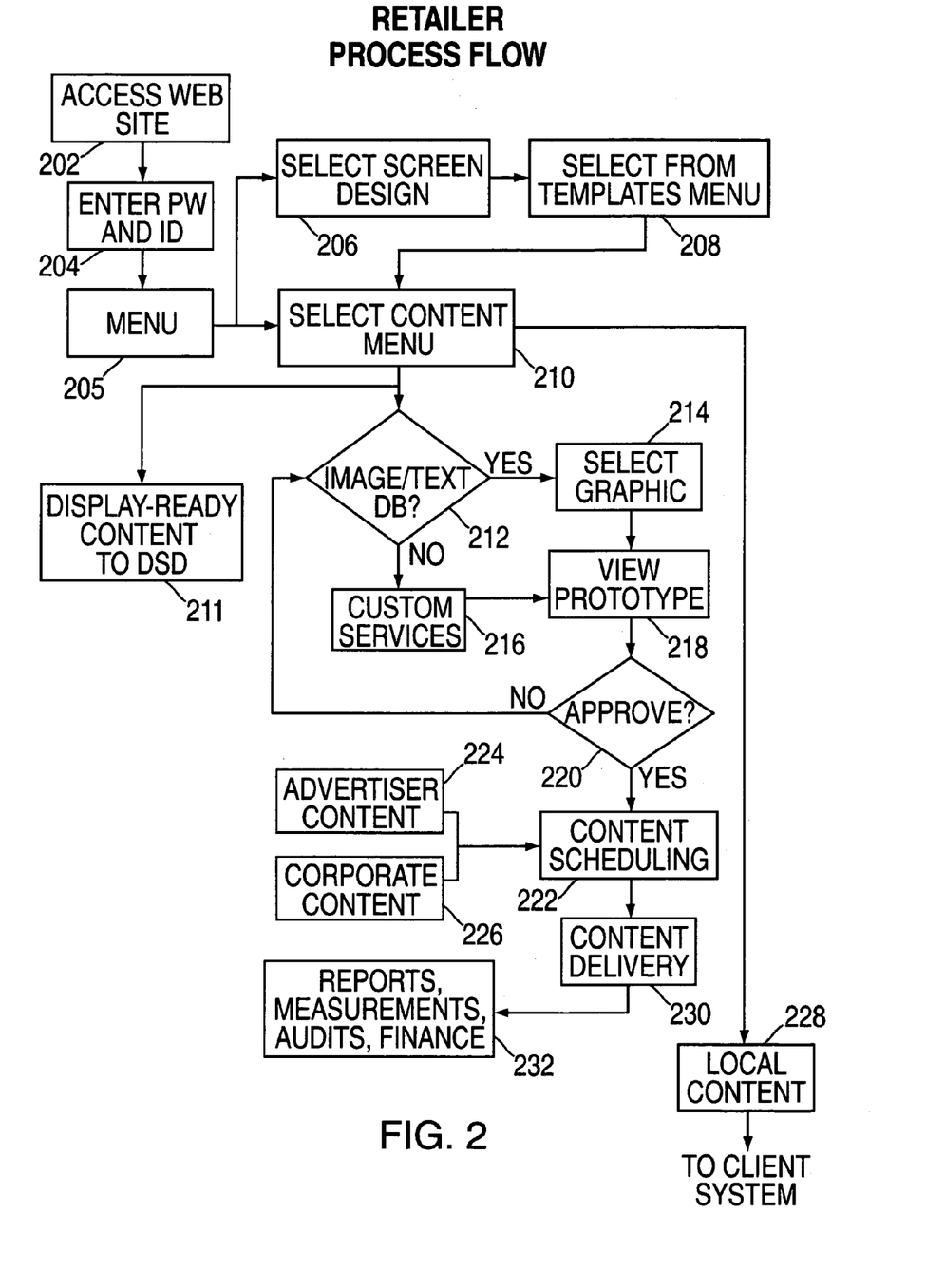
FIG. 2 is a flowchart representing the process of establishing content for the digital messaging display as implemented by a retailer client system.

A subscribing retailer 120 of the digital messaging system may create and update content for viewing on display screen 128 as described in FIG. 2. The retailer at client system 120 accesses the digital messaging web site via a web-enabled workstation 122 at step 202. Hosting system 102 responds by presenting its web page via content server 106 to client system 120 via the Internet. The retailer is prompted to enter a pre-assigned identification and password at step 204. Server 106 authenticates the client's ID and password and if approved, authorizes access to hosting system's 102 services. Services include creating screen displays, adding or changing retail-specific content, approving third-party advertisements, account information and reports. Hosting system 102 then presents the retailer with a main menu screen at step 205 which itemizes the services listed above. A subscribing retailer who wants to generate or modify the layout of a display screen selects "Select Screen Design" at step 206, whereby content server 106 presents the retailer with a variety of screen templates to choose from at step 208. Screen templates comprise multi-tiled windows for displaying a variety of advertisements and other content. Tiles include large and small rectangular shaped windows as well as elongated strips of text-formatted windows for displaying 'looping' text or data materials. Images and graphics can be still frames or fixed images, or may be moving multi-media graphics and text with audio accompaniment. The retailer selects a template for use and the content menu screen is then presented at step 210.

The content menu allows the retailer to create advertisements, select from a list of local content providers, determine display criteria, and transmit display-ready content for viewing. Display-ready content includes pre-designed advertisements and information that is in final form and ready to display on display screen 128. Display-ready content can be transmitted to hosting system 102 via e-mail attachment, file transfer protocol (FTP), snail mail followed by manual loading into storage device 114, or other transmission means. Retailer content includes advertisements pertaining to in-store products, promotions, or services and may be updated as often as desired by retail client system 120. Other content menu options include local content information sources provided by third parties under an agreement with hosting system 102. Local content information sources provide news, weather, sports, stock market indexes, theatre or movie trivia, and other types of information of entertainment value. By providing local content, viewers are attracted or 'pulled' to display screen 128 rather than display screen 128 'pushing' continuous advertisements at the viewers. Examples of local content providers include Reuters™, MediaCast™, Dfilm-.com™, and Newstream.com™. The retailer 120 may select one or more of these items that it believes will complement the needs of its customers. The retailer selects the desired local content provider service and transmits the selection to hosting system 102 at step 228 for storage and scheduling functions.

The retailer may obtain graphics services to facilitate retail content creation by selecting the image/text option at step 212, whereby content server 106 accesses data storage device 114 and retrieves a database of images and graphics tools based upon the nature of business the retailer engages in. The retailer views the selection of graphic images and creates customized content for viewing on display screen 128 at step 214. If the retailer needs assistance in creating the content or using the graphics tools, he/she can query content server 106 for help, whereby server 106 accesses graphics applications server 104 which provides a selection of in-house or independent graphics artists. This selection may be stored in data storage device 114 for centralized applications and access. Independent artists include graphics professionals who register with hosting system 102 to provide services on a contract basis. Independent graphic artists are preferably situated close to the retailer requesting the services. Services provided by graphics artists whether in-house or on a contractual basis are delivered to hosting system 102 which forwards the design to the retailer for viewing at step 218. Alternatively, a retailer who creates a design or content via the self-help image database may also view a prototype of the finished design. Hosting system 102 prompts the retailer to enter an approval or disapproval status for the design prototype at step 220. If the retailer does not approve of the design, flow reverts back to step 212 whereby the retailer repeats the design process described above. If the retailer approves the design, flow proceeds to step 222 where the approval notice is received by hosting system 102 and scheduling functions may begin.

Content scheduling is executed by scheduling server 108 which receives and/or 'pulls' information from various sources for scheduling functions and subsequent transmission to display screen 128. For example, a local or national advertising business subscribes to hosting system 102 for services and submits advertising content to hosting system 102 at step 224. This business selects the retailer at client system 120 to host its advertisement as will be explained further in FIG. 3. Alternatively, an advertising agency may subscribe to hosting system's 102 services on behalf of its clientele. Additionally, a corporate office or merchandizing department of retailer client system 120 may collaborate with the retailer on the content to be provided on display screen 128 at step 226. Content scheduling server 108 delivers this information upon request to server 125, for delayed or immediate viewing based upon the times selected by these content sources at step 230. Local content sources provide its services directly to client system 120 at step 228. It is important to note that retailer at client system 120 may have the option to reject certain advertisements provided by external or third party sources if desired. This approval or rejection occurs before the information is processed by scheduling server 108. Scheduling server 108 is capable of tracking much of the information transmitted to client system 128 and stores that information in data storage device 114.

This information is subsequently processed in a manner such that useful reports, audits, measurements, and accounting information can be obtained. Some of this information is available to retail client system 120 for assessing the effectiveness of the advertisements displayed. For example, the retailer obtains reports on what products were advertised during a block of time and compares that information with the sales receipts for that same time frame. The retailer is now equipped to compare and contrast pre- and post-advertising sales activities over time in order to obtain useful marketing information. This information also enables the retailer to better understand which types of content customers prefer, facilitating quick and inexpensive alterations in the nature and types of content to be scheduled in the future.

Figure 3:
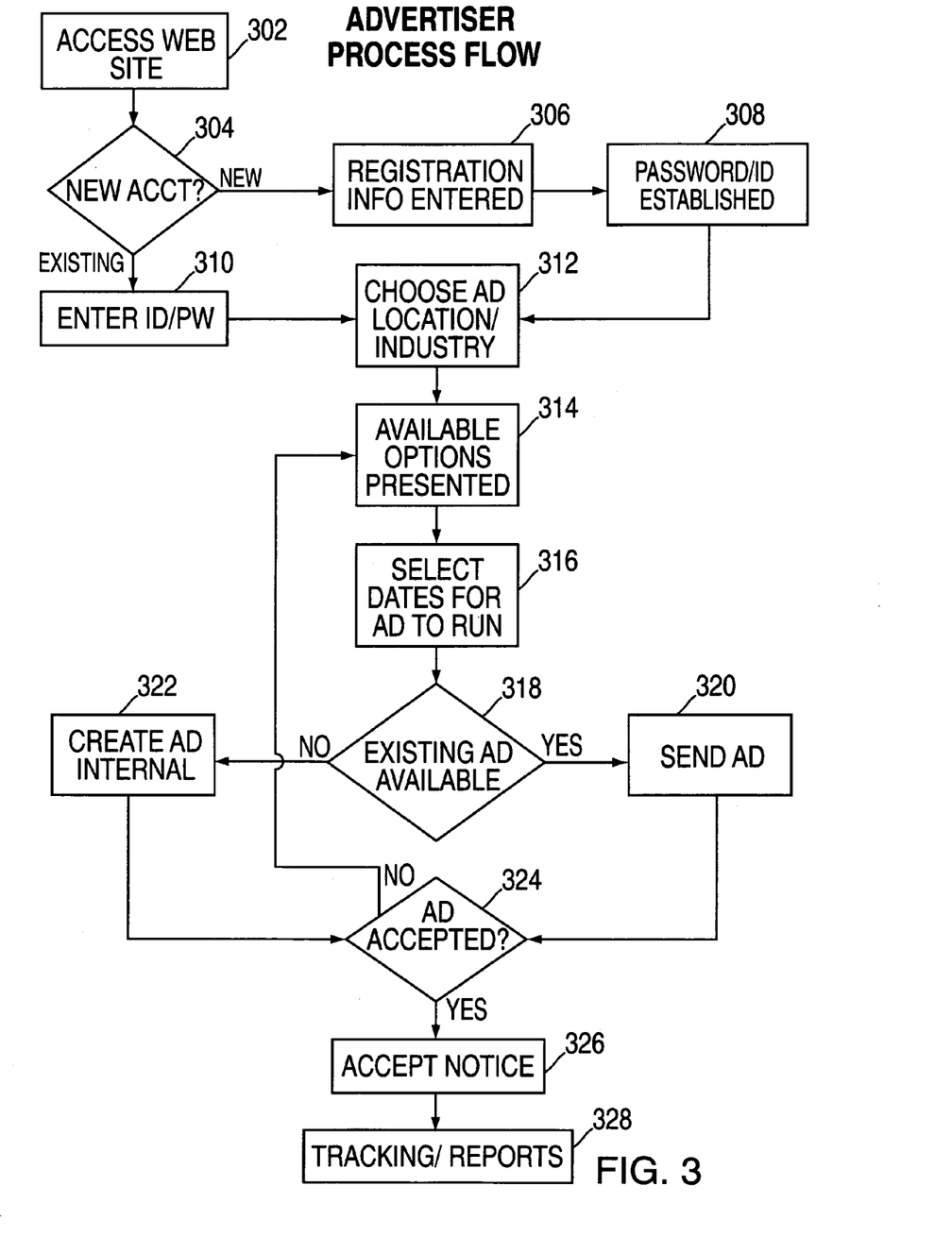
FIG. 3 is a flowchart representing the process of establishing content for the digital messaging display as implemented by an advertiser.
Figure 4:
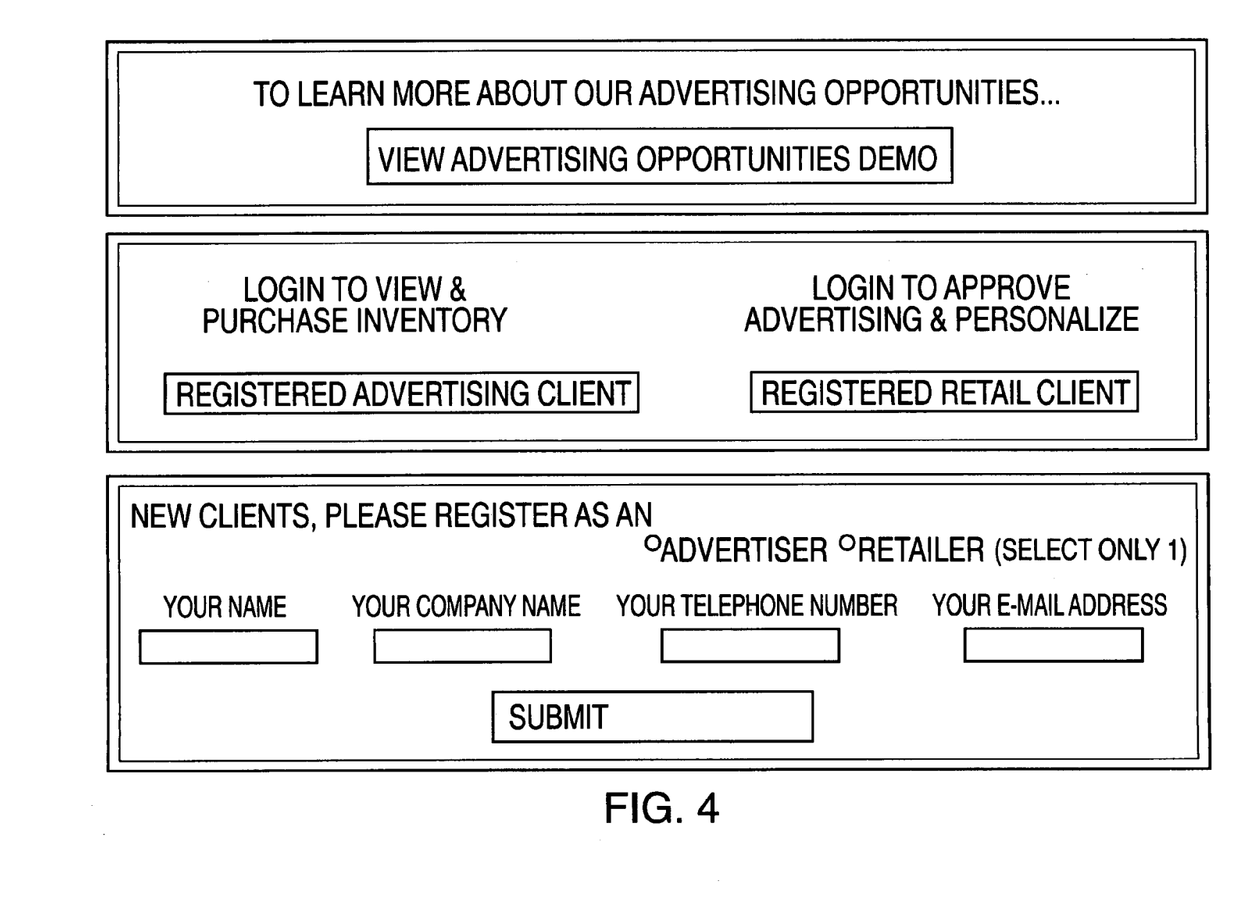
FIG. 4 is a sample digital messaging web page presented to a visitor of the web site for accessing digital messaging services.

Advertisers who wish to market their products on a retailer's display screen can do so utilizing the digital messaging system as described in FIG. 3. The advertiser accesses the digital messaging service web site at step 302 via a web-enabled workstation. The web page provided by digital messaging allows a prospective advertiser to receive additional information and view demos of the process. A sample web page is shown generally in FIG. 4. Those advertisers who wish to initiate this service are prompted to designate whether they are new or existing customers of digital messaging service at step 304. If new, the advertiser enters general information via a registration form such as identification, address, location, type of business, payment method, etc. at step 306. This sets up the advertisers account with digital messaging service. The digital messaging application then allows the advertiser to establish a password and identification for security purposes at step 308. If the advertiser already maintains an account with digital messaging, it selects 'no' at step 304 and is asked to enter a password and identification at step 310. Whether a new account or existing account, the advertiser is prompted to select from a list of advertisement locations or industries with which the ad is to be displayed at step 312. If the advertiser chooses a location, the digital messaging application provides a list of retailers for that location from which the advertiser may choose at step 314. Location fields may include state, region, zip code ranges, or other criteria. Other information to be provided by the advertiser includes the size of the tile desired for its ad and the duration of time the ad is to be displayed. Time slots are blocks of time during which content is displayed and are units of a loop. An advertiser may select from a pre-defined list of time slots for a given loop which may further be defined by the size and location of the tile on the screen. For example, an advertiser may select its ad to run for one time slot equaling 15 seconds for a specified loop that runs eight 15-second slots before repeating itself. At step 316, the advertiser is then prompted to select the dates for which the ad should run. Once completed, the advertiser is asked if it has a current ad ready for delivery or display, or whether the advertiser needs to design or create an ad at step 318. If the advertiser has its ad ready for display, it is prompted to send the ad to host system 102 for further action. The advertiser may send the ad via any electronic or mechanical means desired. If the advertiser does not have an ad but would like assistance in creating one, it may notify host system 102 of such at step 322 whereby digital messaging provides access to its graphics database or it may provide the advertiser with personalized, in-house services similar to those described in FIG. 2. In-house services include digital messaging service's graphic artists or independent artists local to the advertiser working on a contractor-type basis.

Once the ad is completed, it is delivered to the digital messaging system for required approvals at step 324. Approvals come from host system 102, the retailer targeted for displaying the ad, the corporate offices of the retailer, as well as the advertisers themselves. Once accepted at step 326, the advertiser is notified of the acceptance, payment procedures are employed, and the ad is tracked by the digital messaging system at step 328. Discounts from advertisements displayed on the retailer's screen are transmitted to the retailer via these tracking procedures.

Figure 5:
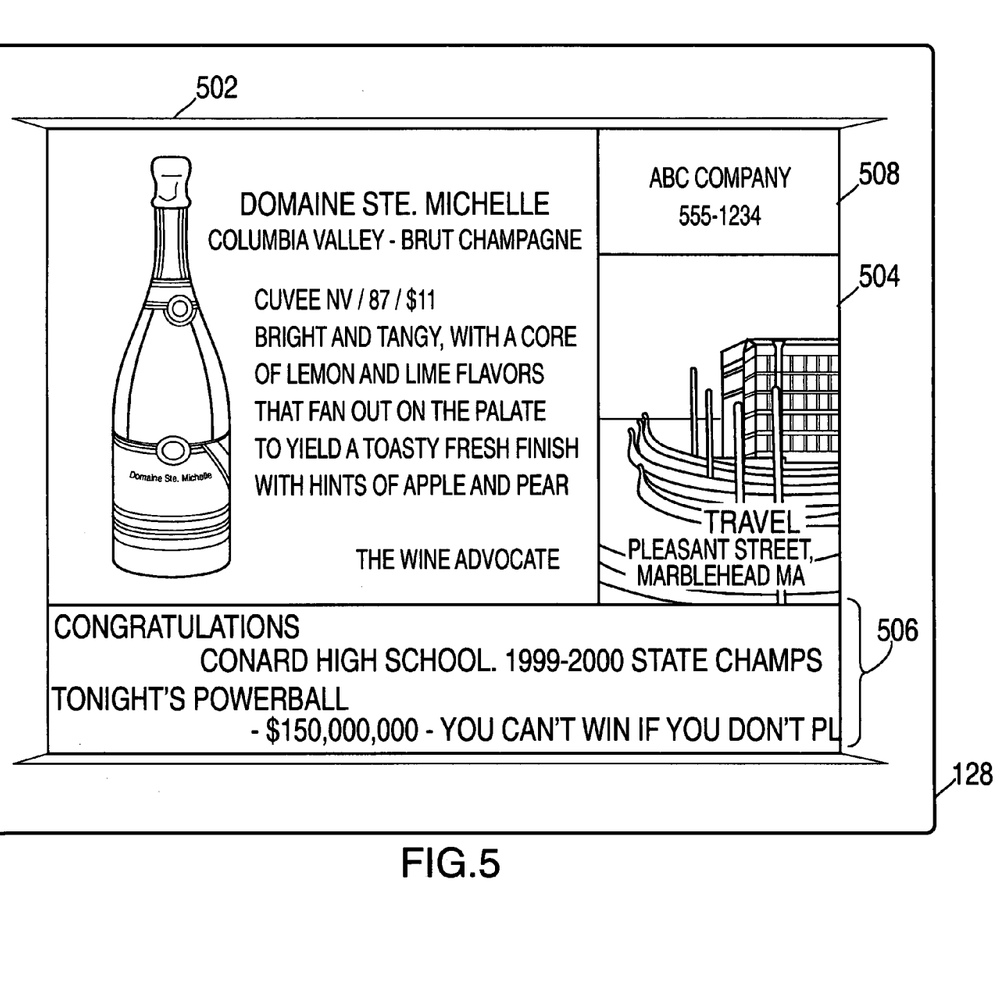
FIG. 5 is a sample display screen illustrating bundled content configured for a retail establishment.

FIG. 5 illustrates a sample retailer display screen 128 with the collected content from local content providers and advertisers factored in. Display screen 128 includes multi-tiled windows of various sizes for providing multiple displays of news and advertising content. Window 502 displays the customized content as selected by a retailer and as described in FIG. 2 above, pertaining to store products, services, and sales. Window 504 depicts advertiser-generated content as described in FIG. 3. Directly below windows 502 and 504 is window 506. Window 506 includes content provided by local content provider 150 and selected by the retailer as described in FIG. 2. Window 506 may also include content provided by the retailer if desired. Window 508 is sized proportionately to simulate a business card and can provide advertising content from a national or local advertiser 140. Display times/durations and tile size determine in part the cost of running an ad for an advertiser.

Figure 6:
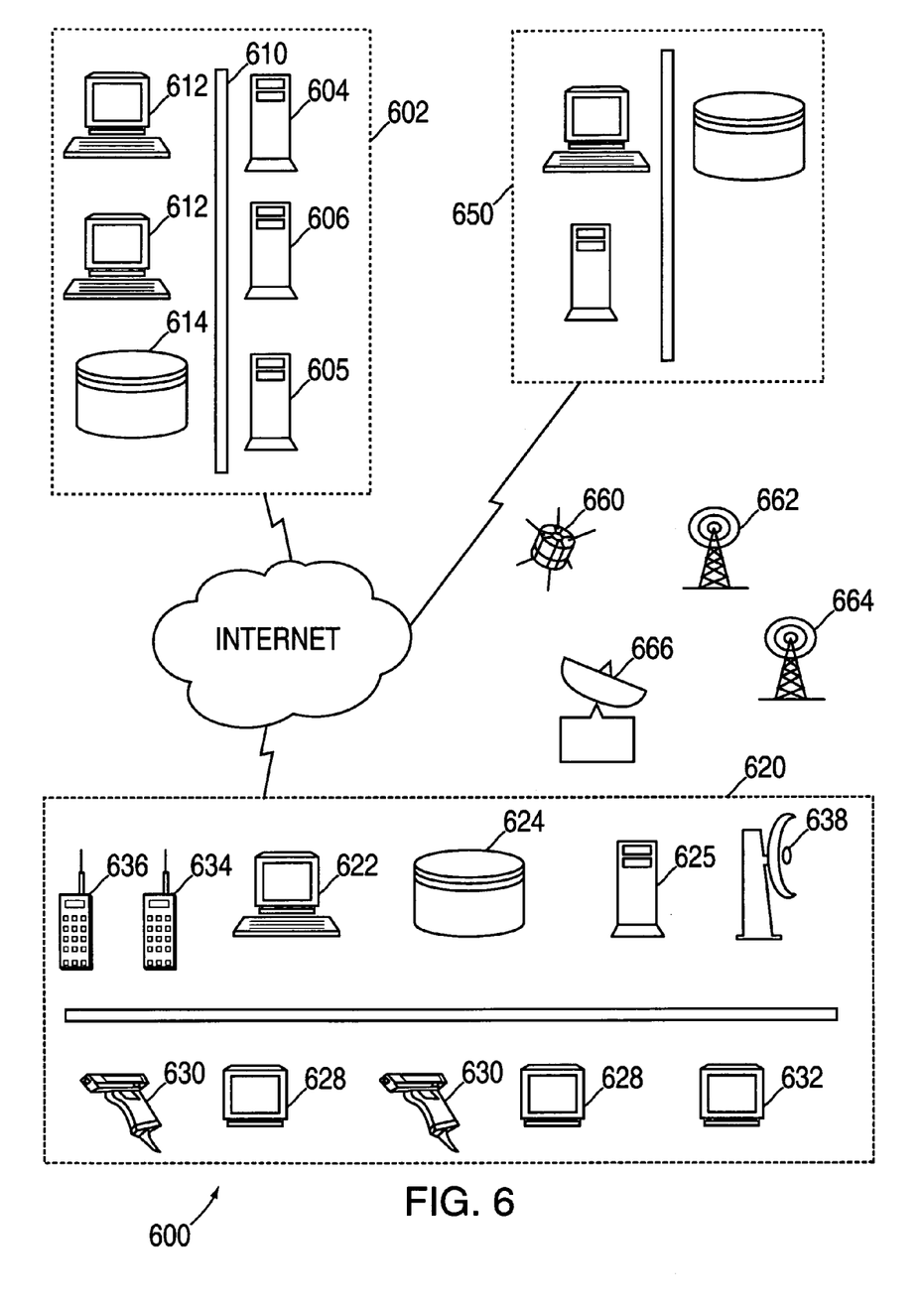
FIG. 6 is a block diagram of a portion of a network system on which the digital messaging system is implemented in an alternative embodiment of the invention.

FIG. 6 illustrates a diagram of a portion of a network for implementing the digital messaging system in accordance with a second embodiment of the invention. System 600 includes a hosting system 602 for implementing the digital messaging system. Similar to system 100 of FIG. 1, hosting system 602 may be part of a wide area network (WAN), virtual private network (VPN), or combination of both in which different geographical locations are interconnected, either by high-speed data lines or by radio links, interconnecting multiple workstations at widely disparate locations. In the simplified diagram of FIG. 6, hosting system 602 includes a graphics applications server 604, a content server 606, and a scheduling server 608, all of which are in communication with each other and with entities associated with hosting system 602 via a network connection 610. For purposes of illustration, network 610 is an intranet network infrastructure operating on a local area network (LAN). Network 610 is connected to the Internet via content server 606. Content server 606 includes web server software for hosting and serving web pages of hosting system 602. Content server 606 also includes applications software for initiating customer registration, authorizing access to hosting system's 602 applications, directing visitor requests, forwarding screen-ready content to client system 620, and accessing image and templates databases from data storage device 614.

Graphics applications server 604 provides software for creating, designing, and customizing content via in-house or independent graphics artists, verifying design approvals and disapprovals and forwarding them to designated entities, sending notifications to interested parties concerning the approvals or disapprovals of design templates and content, and saving the finished products to data storage device 614 for subsequent scheduling functions and retrieval by subscribing entities.

Scheduling server 608 periodically pulls finished content or display-ready materials from data storage device 614, checks times, dates, and locations for these materials and prepares them for display. Server 608 collects these materials and delivers the finished product by the Internet to server 625 for delayed or immediate display on screen 628. Delivery may be accomplished in various ways as described in FIG. 1. For example, client system 620 periodically dials up or contacts hosting system 602 and downloads content via an automated or semi-automated process. Hosting system 602 may also provide notification of content to be delivered to client system 620, followed by transmission of the content for storage and subsequent display at client system 620. Server 608 also tracks and audits this information and generates various reports in accordance with business rules adopted by hosting system 602 and/or client system 620.

Also included in hosting system 602 are workstations 612 utilized by hosting system 602. Workstations 612 communicate with each other, as well as with servers 604, 606, 608, and data storage device 614. Workstations 612 may be general-purpose computers, or personal computers (PCs) and include a keyboard or other input device for entering commands and accessing applications and data associated with entities of hosting system 602 such as servers 604, 606, 608, and data storage device 614. Alternatively, servers 604, 606, and 608 may include monitors, input devices and storage mediums in lieu of workstations 612 and data storage device 614. Data storage device 614 houses databases pertaining to customer registration data, customer billing and reporting, marketing analyses and measurements, and any other information desired by hosting system 602. Hosting system 602 may be connected to the Internet via plain old telephone service (POTS), DSL, T-1, ISDN, or other high-speed communications medium known in the art.

Hosting system 602 provides digital advertising and information services via the Internet to subscribing client systems 620 utilizing the digital messaging applications and system devices. Hosting system 602 may provide the necessary hardware, software, network connections, information services, and system maintenance and repair to subscribing customers such as client system 620 for a monthly fee. Customized graphics services may also be provided for a fee. Hosting system 602 is the conduit through which national and local advertisers may market products on subscribing systems and through which discounts or rebates are tracked and delivered to subscribing systems which display these advertisements.

Also included in system 600 is client system 620 comprising a workstation 622 coupled to a data storage device 624 and display screens 628 via a network connection 626. Client system 620 is typically a retailer who subscribes to hosting system's 602 services. A server 625 may also be included in client system 620 and is coupled to workstation 622 via a network connection 626. Network connection 626 may be any suitable communications link capable of quickly transmitting information between display screens 628 and server 625. Display screens 628 may be include monitors, kiosks, screens or other vehicles that display images and text. Display screens 628 may be cathode ray tubes (CRTs), liquid crystal displays (LCDs), gas plasma, or other similar type displays. Display screens 628 may be connected to workstation 622 in either a wired or wireless fashion. Additionally, any number of display screens 628 may be simultaneously utilized by client system 620, each capable of displaying different content. Display screens 628 may be coupled to bar code scanner devices 630 for allowing interactive communications between a user, client system 620, and hosting system 602.

Workstation 622 may be a personal computer (PC) including an input device such as a keyboard, mouse, etc. Workstation 622 also includes an internal or external memory such as data storage device 624, and web browser software capable of communicating with hosting system 602. Data storage device 624 stores display-ready content, billing information, reports, market analyses received from hosting system 602, as well as any proprietary information desired by client system 620. Alternatively, data storage device 614 may store this data for subsequent query and retrieval by client system 620. A user, typically a customer of client system 620, accesses product information for viewing on either of display screens 628 via a selected input device, such as cell phone 636, personal digital assistant 634, bar code scanner 630, or other similar input device. The input device provides a user interface indirectly through client system 620 to the source of the requested information. Sources of information may include a product information database stored in data storage device 624 and/or 614, or sources may include hypertext links to external supplier data located outside of system 600. Modern telecommunications systems such as wireless cellular, voice or digital networks, RF, IR, or global satellite technologies may also be employed by system 600 for implementing the digital messaging system and applications of the present application. For example, client system 620 may utilize a satellite dish 638 for receiving wireless communications from hosting system 602 via satellite 660. Additionally, a customer or sales representative at client system 620 may access digital messaging services via a cellular or digital telephone operating on a radio frequency via communications towers 662 and 664 or via satellite ground station 666 and global satellite 660. Further one or more combinations of these technologies may be employed by system 600 in order to realize the advantages of the digital messaging system and applications.

System 650 represents one source of information identified by a user at client system 620 who is requesting product information. System 650 may be a manufacturer of a product sold by client system 620, a database supplied by client system 620 housing product information, or other similar source of information.

Figure 7:
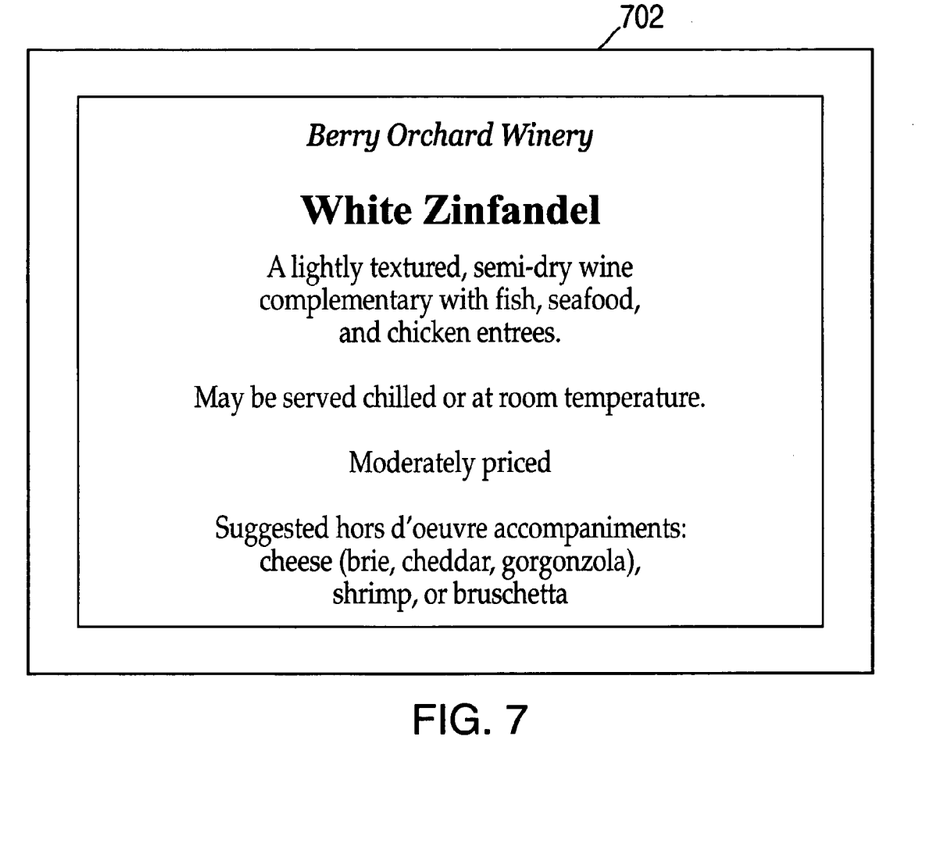
FIG. 7 is a sample display tile from a display screen depicting user-customized content in accordance with an alternative embodiment of the invention.

FIG. 7 illustrates a portion of a sample display screen 702 as seen by a consumer at retail establishment 620 and which is enabled by system 600 in accordance with the second embodiment. A customer, visitor, or sales associate of retail client system 620 obtains specific product information to be displayed on display screen 628 for viewing. As indicated earlier, the requester of the information may obtain this information by various input devices such as a cell phone 636, personal digital assistant (PDA) 634, bar code scanner 630, keyboard (not shown), or other similar means. For example, a customer is browsing through the aisles of retail client system 620 looking for a bottle of wine. The customer may have no knowledge or limited knowledge about wines in general or may be curious about a new product on display within that aisle. The customer may utilize one or more of the following methods of obtaining information. A customer dials a toll-free phone numbered located near the product in question and is prompted to enter a product code identification. Alternatively, a voice recognition system may be implemented whereby the customer speaks directly into cell phone 636, directing the inquiry through available options. A recorded message is retrieved and delivered to the cell phone including detailed product information. An option remains for the customer to speak directly with a sales representative of the product's manufacturer.

The customer may choose to access information pertaining to a product or manufacturer by accessing a web site via PDA device 634. The user enters a web site address located at or near the product or manufacturer display in question and receives a web page prompting the customer to identify the product or question of a given subject matter. The information is presented to PDA 634 either directly via the manufacturer or via the hosting system's 602 web site, depending upon the network configuration.

Yet another method of obtaining product or manufacturer information is via bar code scanning device 630 coupled to one of display screens 628 located near the product or manufacturer display in question. The customer scans the bar code label located on the bottle of wine or on the wine's display shelf, and display screen 628 displays a variety of useful information pertaining to the product scanned within a designated tile such as tile 702 of FIG. 7. It should be noted that only a portion of display screen 628 displays this information, namely tile 702. The other tiles remain unaffected and ready for viewing by other visitors of retail client system 620. For example, referring back to FIG. 5, tile 502 would change to reflect the requested information by a visitor, while tiles 504, 506 and 508 remain in tact. Further, a plurality of display screens 628 and associated bar code scanners 630 may be utilized by retail client system 620 in order to allow simultaneous use by multiple customers.

Although not shown in FIG. 6, other interactive devices of communicating messages may be utilized by system 600. For example, a kiosk device may be employed to provide not only product and consumer information, but may also be configured to dispense cash for customers with authorized access. Kiosks are well-known computerized devices that are becoming more and more prevalent in highly-trafficked areas such as airports, museums, etc. Kiosks are information disseminating devices tailored to meet the needs of the types of visitors located in that area or space. A display screen on a kiosk device provides interactive communication and retrieval of information requested by a customer or visitor of retailer client system 620. A user at a kiosk selects from menu items displayed on screen 628. Responses to the user's queries are presented on the screen.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring to cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not by limitation.

The invention claimed is:

1. A system for providing digital messaging services received from multiple sources over a communications network, comprising:
    a client system, including:
        a display screen coupled to a communications link; and
        a workstation including a web browser, a user interface, a memory, and a processor, said workstation coupled to said communications link;
    a hosting system, including:
        a server coupled to a communications link;
        a workstation for:
        accessing applications stored on said server;
        inputting and retrieving information stored within said hosting system,
        wherein said workstation is coupled to said communications link; and
        a data storage device for storing data utilized by said hosting system;
    wherein said hosting system is accessible to said communications network;

wherein said client system and said hosting system are in communication with each other, and wherein further, said hosting system provides digital messaging services to said client system;

an input device for entering product information and initiating selection of display-ready content related to the product from said storage device for display on said display screen;

said input device is a bar code reader and the product includes a bar code, said input device initiating selection of said display-ready content upon said bar code reader reading the bar code, said bar code reader and said display screen being located proximate to the product in a retail establishment; wherein said display displays information in a number of windows, said initiating selection of display-ready content related to the product from said storage device for display on said display screen altering the display of only one the windows related to in-store products.

* * * * *

UNITED STATES PATENT AND TRADEMARK OFFICE
CERTIFICATE OF CORRECTION

PATENT NO. : 7,797,374 B2  Page 1 of 1
APPLICATION NO. : 09/836890
DATED : September 14, 2010
INVENTOR(S) : George Prince It is certified that error appears in the above-identified patent and that said Letters Patent is hereby corrected as shown below:

Title Pg, Item (73) Assignee: Should read as follows:

CBS Outernet, Inc., Fairfield, CT

Signed and Sealed this
Eighth Day of March, 2011

David J. Kappos
*Director of the United States Patent and Trademark Office*